(12) United States Patent
Kouno

(10) Patent No.: US 11,845,309 B2
(45) Date of Patent: Dec. 19, 2023

(54) TIRE

(71) Applicant: BRIDGESTONE CORPORATION, Tokyo (JP)

(72) Inventor: Yoshihide Kouno, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 200 days.

(21) Appl. No.: 17/595,845

(22) PCT Filed: May 14, 2020

(86) PCT No.: PCT/JP2020/019316
§ 371 (c)(1),
(2) Date: Nov. 26, 2021

(87) PCT Pub. No.: WO2020/241286
PCT Pub. Date: Dec. 3, 2020

(65) Prior Publication Data
US 2022/0194130 A1 Jun. 23, 2022

(30) Foreign Application Priority Data
May 29, 2019 (JP) .................................. 2019-100730

(51) Int. Cl.
*B60C 7/06* (2006.01)
*B60C 7/18* (2006.01)
*B60C 7/26* (2006.01)
*B60C 7/16* (2006.01)

(52) U.S. Cl.
CPC .................. *B60C 7/06* (2013.01); *B60C 7/16* (2013.01); *B60C 7/18* (2013.01); *B60C 7/26* (2013.01); *B60B 2900/551* (2013.01)

(58) Field of Classification Search
CPC .... B60C 7/18; B60C 7/06; B60C 7/16; B60C 7/24
See application file for complete search history.

(56) References Cited

U.S. PATENT DOCUMENTS

| 798,225 A | 8/1905 | Sterling |
| 942,097 A | 12/1909 | Norcross |
| 1,087,626 A | 2/1914 | Orren |
| 1,142,279 A * | 6/1915 | Stephens .................. B60C 7/16 152/277 |

(Continued)

FOREIGN PATENT DOCUMENTS

| CN | 2349043 Y | 11/1999 |
| CN | 1462245 A | 12/2003 |

(Continued)

OTHER PUBLICATIONS

Sep. 9, 2022, search result of Office Action issued by the China National Intellectual Property Administration in the corresponding Chinese Patent Application No. 202080039866.7.

(Continued)

*Primary Examiner* — Kip T Kotter
(74) *Attorney, Agent, or Firm* — KENJA IP LAW PC

(57) ABSTRACT

A tire includes: a skeleton portion including a rim member, a plurality of body springs latched on the rim member, and a plurality of interlink springs interlaced with the body springs; and a tread member disposed at least on the outer periphery of the skeleton portion.

14 Claims, 19 Drawing Sheets

(56) References Cited

U.S. PATENT DOCUMENTS

| | | |
|---|---|---|
| 1,168,283 A | 1/1916 | Miklos |
| 1,171,507 A | 2/1916 | De Loe |
| 1,217,461 A | 2/1917 | Kemmerich |
| 1,227,348 A | 5/1917 | Wale |
| 1,248,636 A | 12/1917 | Eakens |
| 1,291,477 A | 1/1919 | Girard |
| 7,469,734 B2 | 12/2008 | Zuigyou |
| 2011/0025118 A1* | 2/2011 | Kouno ............ B60B 9/28 301/41.1 |
| 2011/0277893 A1 | 11/2011 | Benzing, II |
| 2019/0061428 A1 | 2/2019 | Wako et al. |

FOREIGN PATENT DOCUMENTS

| | | |
|---|---|---|
| CN | 101973186 A | 2/2011 |
| CN | 102431394 A | 5/2012 |
| CN | 107187275 A | 9/2017 |
| CN | 107253341 A | 10/2017 |
| CN | 207711723 U | 8/2018 |
| CN | 109203862 A | 1/2019 |
| EP | 1225063 A2 | 7/2002 |
| GB | 191016683 A | 9/1910 |
| GB | 120478 A | 11/1918 |
| JP | H0671209 U | 10/1994 |
| JP | H06286419 A | 10/1994 |
| JP | 2003306010 A | 10/2003 |
| JP | 2008296894 A | 12/2008 |
| WO | 2010138150 A2 | 12/2010 |

OTHER PUBLICATIONS

Mar. 10, 2023, search result of Office Action issued by the China National Intellectual Property Administration in the corresponding Chinese Patent Application No. 202080039866.7.

May 11, 2023, search result of the Extended European Search Report issued by the European Patent Office in the corresponding European Patent Application No. 20815506.9.

Jul. 14, 2020, International Search Report issued in the International Patent Application No. PCT/JP2020/019316.

Nov. 16, 2021, International Preliminary Report on Patentability issued in the International Patent Application No. PCT/JP2020/019316.

* cited by examiner

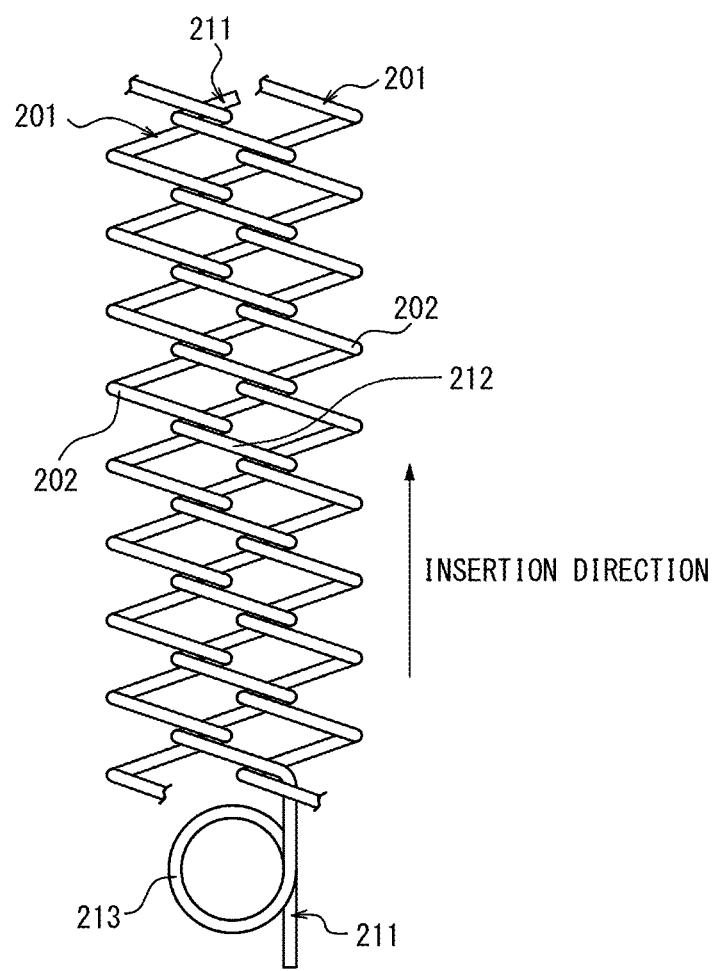

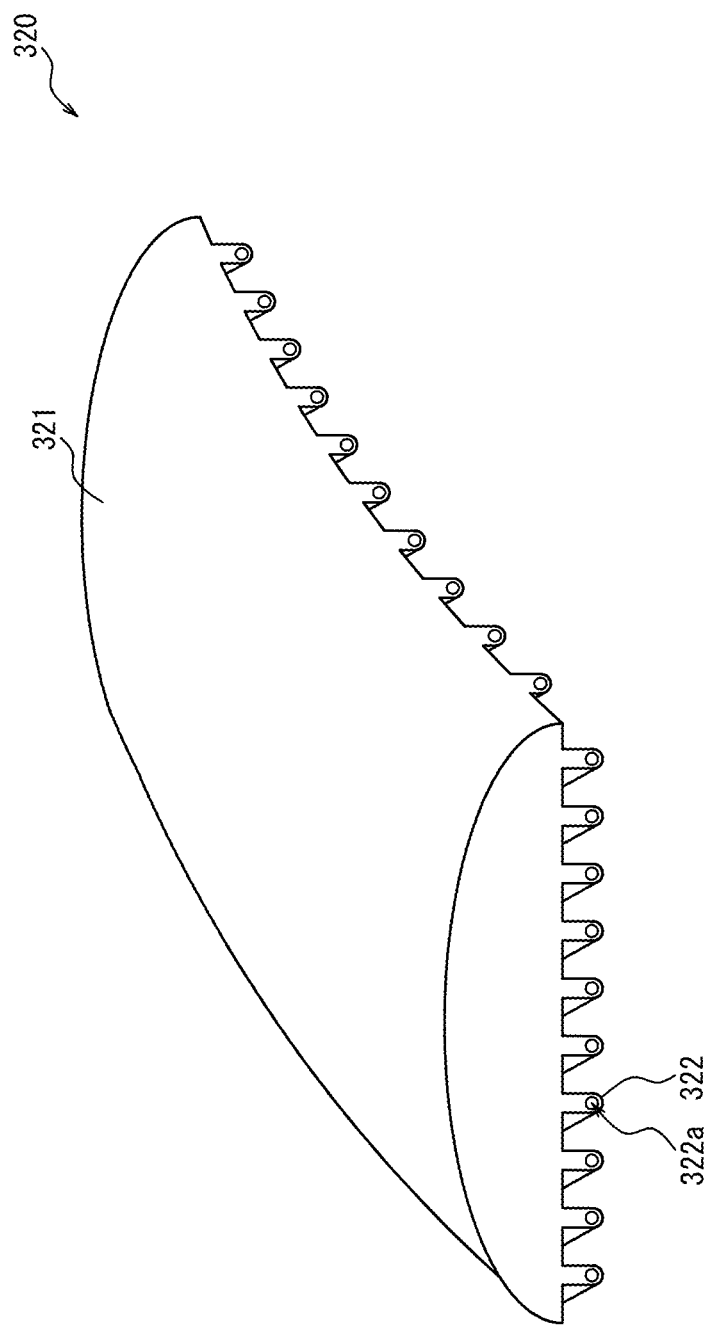

TIRE

TECHNICAL FIELD

The disclosure relates to a tire.

BACKGROUND

Tires including coil springs are conventionally known. For example, Patent Literature (PTL) 1 discloses a tire in which a respective plurality of coil springs are interlaced with other coil springs and secured to annular rims to form a toroidal shape as a whole.

CITATION LIST

Patent Literature

PTL 1: WO 2010/138150

SUMMARY

Technical Problem

However, in a tire as disclosed in PTL 1, a wheel includes springs such as coil springs, and due to existence of a large number of voids between the springs, the tire may not be able to be used as appropriate depending on a running environment. For example, in a case in which the tire disclosed in PTL1 is used on sandy ground or the like, the tire may be buried in the ground due to sand that enters gaps between the coil springs. In addition, the sand may enter the center of rotation of the wheel through the gaps between the coil springs and cause an abnormality of a drive mechanism, for example, in a case in which there is a drive mechanism or the like in the center of rotation of the wheel. Accordingly, the tire disclosed in PTL 1 may cause deterioration in desired running performance, such as driving force.

It would be helpful to provide a tire, configured with springs, that is less likely to cause deterioration in running performance.

Solution to Problem

A tire according to the disclosure includes: a skeleton portion including a rim member, a plurality of body springs latched on the rim member, and a plurality of interlink springs interlaced with the body springs; and a tread member disposed at least on the outer periphery of the skeleton portion.

Advantageous Effect

According to the disclosure, it is possible to provide a tire, configured with springs, that is less likely to cause deterioration in running performance.

BRIEF DESCRIPTION OF THE DRAWINGS

In the accompanying drawings:

FIG. 9B is a schematic diagram illustrating the example of the method for joining the interlink spring to the body springs;

FIG. 20 is an external perspective view illustrating an example of a rubber tread.

DETAILED DESCRIPTION

An embodiment of the disclosure will be exemplarily described below with reference to the drawings.

Figure 1:
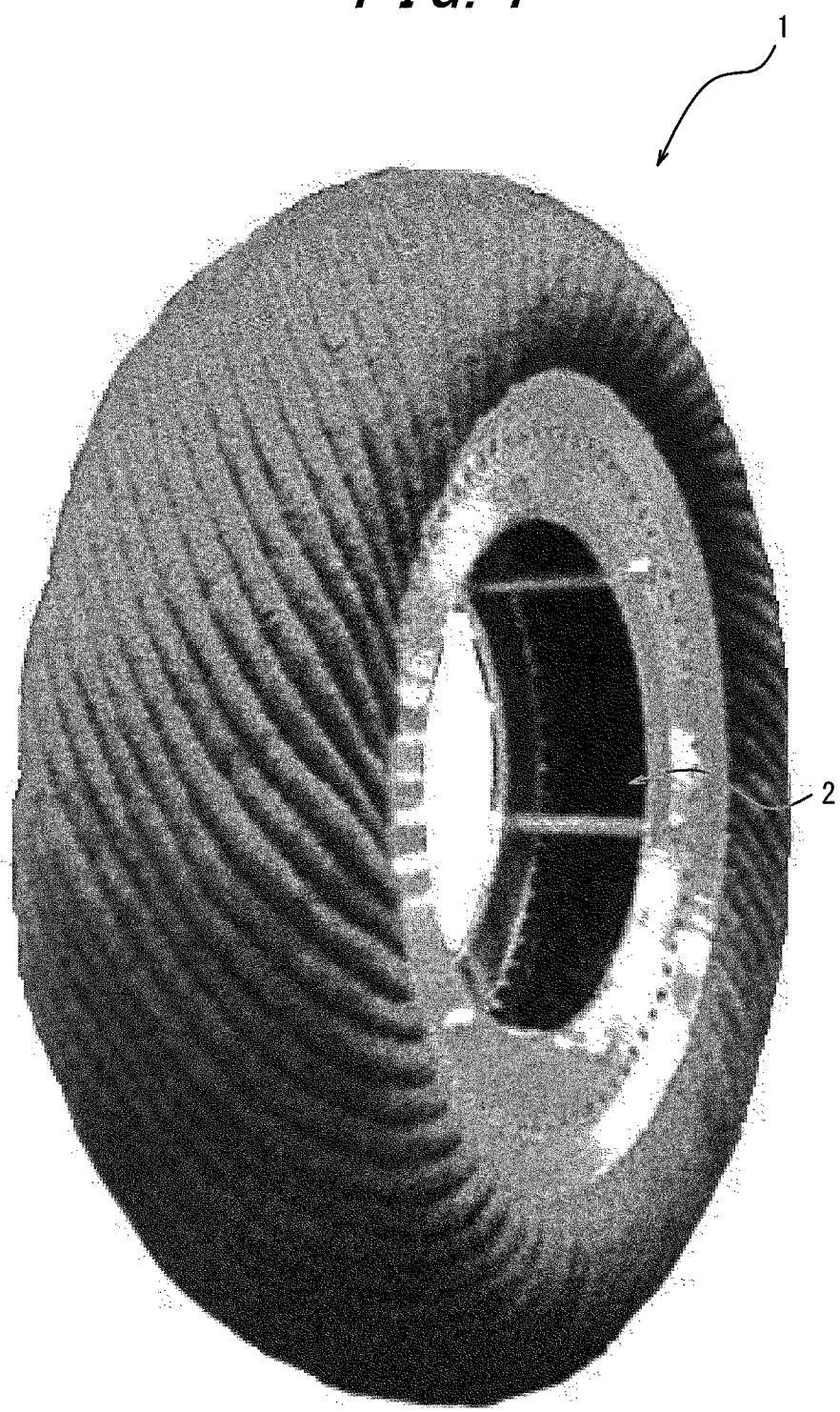
FIG. 1 is an external perspective view of a tire according to an embodiment of the disclosure.

FIG. 1 is an external perspective view of a tire 1 according to an embodiment of the disclosure. The tire 1 according to the present embodiment includes a skeleton portion 2 that defines the structure of the tire 1 and tread members 300 mounted on the skeleton portion 2.

Figure 2:
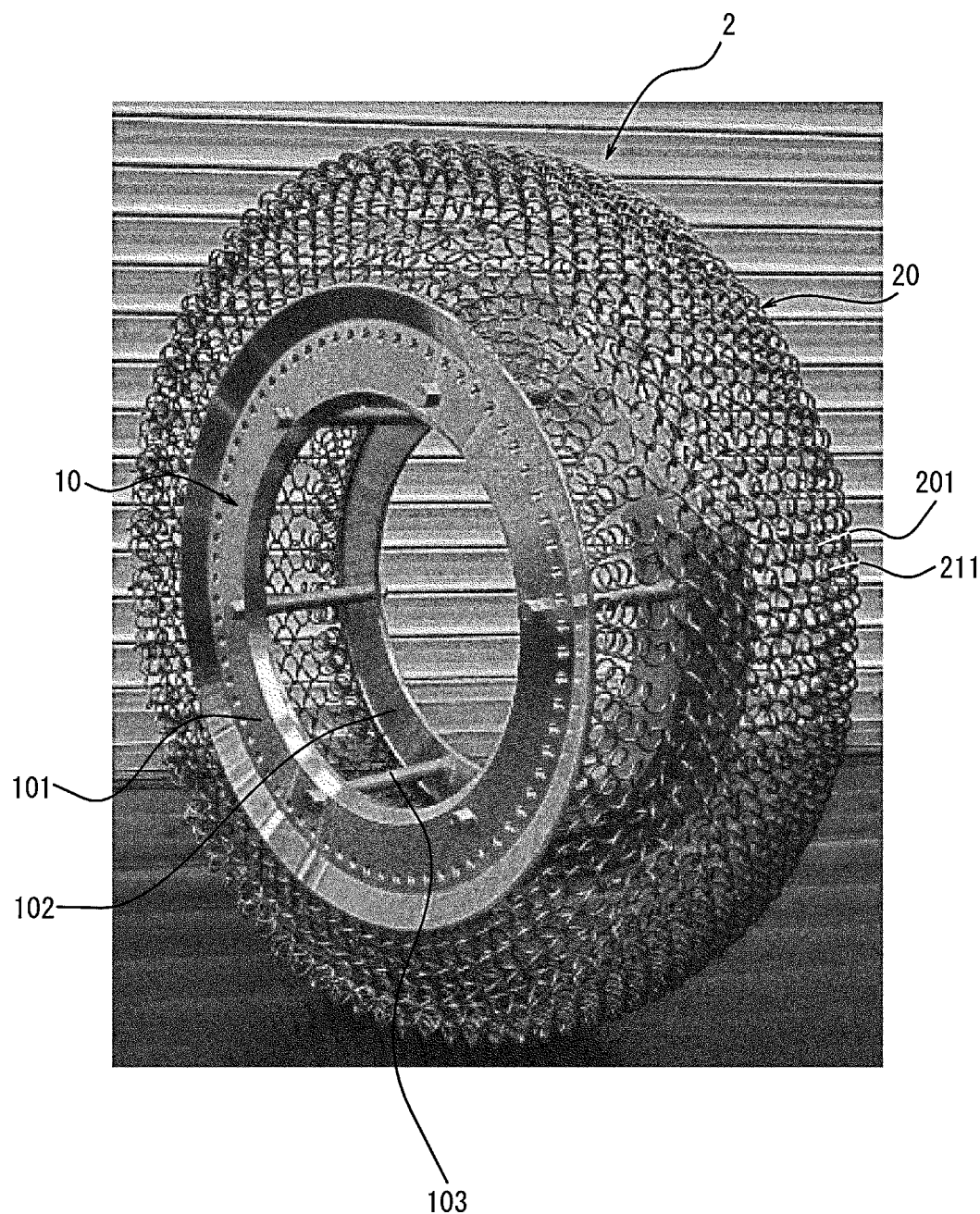
FIG. 2 is an external perspective view of a skeleton portion of the tire of FIG. 1.

FIG. 2 is an external perspective view of the tire 1 according to the embodiment of the disclosure. As illustrated in FIG. 2, the skeleton portion 2 of the tire 1 according to the present embodiment includes a wheel portion 10 having a rim portion, and a grounding deformable portion 20 that is deformable while being grounded.

Figure 3:
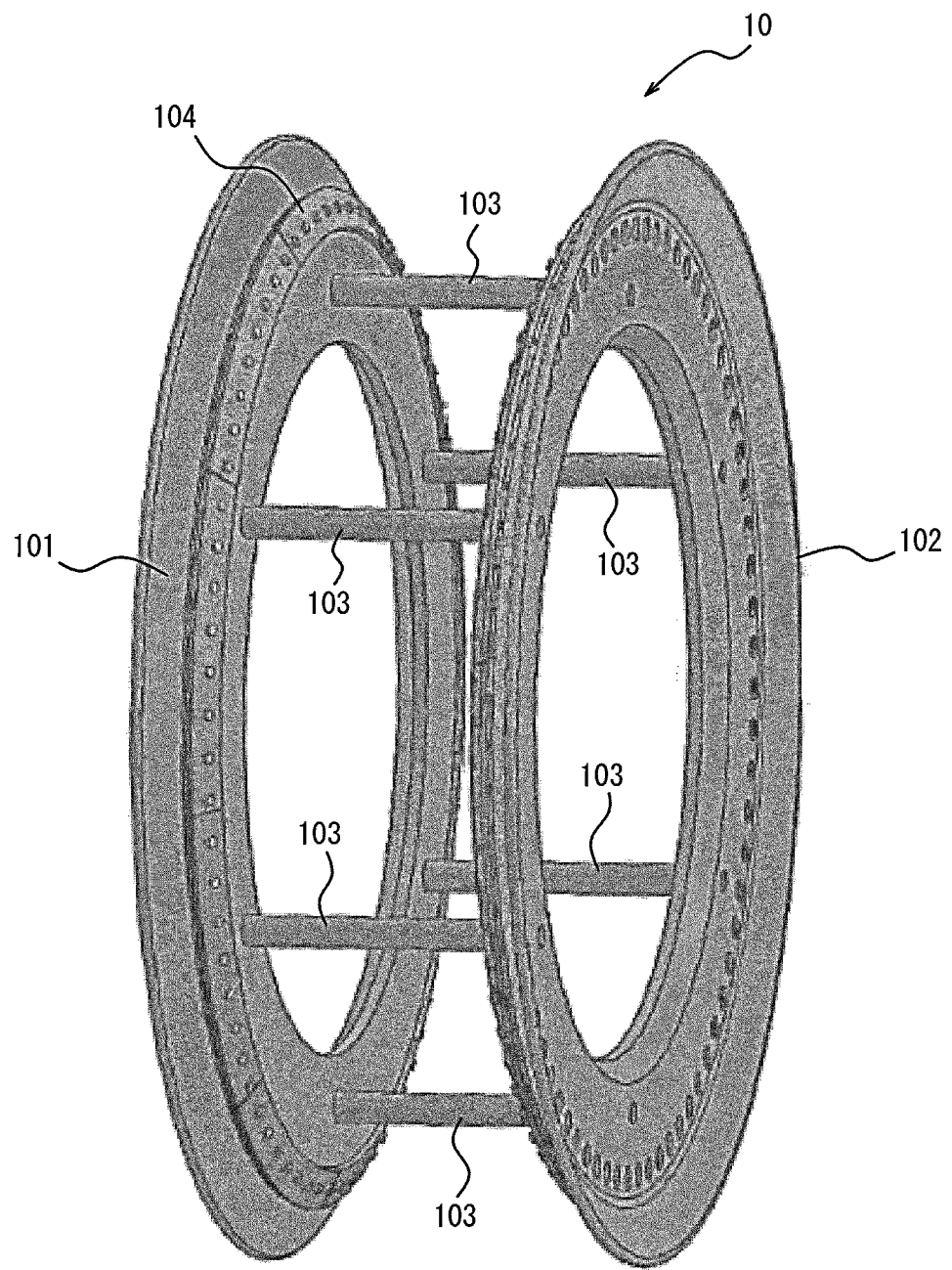
FIG. 3 is an external perspective view of rim members of FIG. 2.

FIG. 3 is an external perspective view of the wheel portion 10 of FIG. 2. The wheel portion 10 is provided with a plurality of rim members. In the present embodiment, as illustrated in FIGS. 2 and 3, the wheel portion 10 is provided with, as the rim members, a first rim member 101 and a second rim member 102. The number of the plurality of rim members provided in the wheel portion 10 does not necessarily have to be two as in the present embodiment, but can be two or more. In the present embodiment, as illustrated in FIG. 3, the wheel portion 10 is further provided with a plurality of connection members 103.

The first rim member 101 and the second rim member 102 are made of metal or resin. The first rim member 101 and the second rim member 102 are disposed at different positions on the same axis. The first rim member 101 and the second rim member 102 are each formed in an annular shape. In the present embodiment, the first rim member 101 and the second rim member 102 are configured to be the same size and shape. However, as long as the tire 1 can perform functions as a tire, the first rim member 101 and the second rim member 102 may be configured in different sizes or shapes. The outer diameter of the first rim member 101 and the second rim member 102 may be determined according to the size of the tire 1 required.

The connection members 103 are members that connect between the first rim member 101 and the second rim member 102. The connection members 103 are made of metal or resin. In the present embodiment, as illustrated in FIG. 3, the wheel portion 10 is provided with six connection members 103, but the number of the connection members 103 provided in the wheel portion 10 is not limited thereto. The plurality of connection members 103 are attached to one side of the annular first rim member 101 and one side of the annular second rim member 102. In this specification, in the wheel portion 10, the side on which the connection members 103 are attached to the first rim member 101 and the second rim member 102 is referred to as an inner side in a tire width direction, and the side on which the connection members 103 are not attached is referred to as an outer side in the tire width direction.

In the present embodiment, the first rim member 101 and the second rim member 102 have, in inner surfaces in the tire width direction, engagement receiving portions 105 (see FIG. 6) in which body springs 201 of the grounding deformable portion 20 are engaged. Details of the engagement receiving portions and an aspect of engagement will be described later. In this specification, "engagement" refers to being fitted together, and "latching" refers broadly to being fastened together, including being fitted together.

In the present embodiment, as illustrated in FIG. 3, a support member 104 is attached to each of the first rim member 101 and the second rim member 102. The support member 104 is a member that maintains a state of engaging the grounding deformable portion 20 in the engagement receiving portions 105 (see FIG. 6). The support members 104 can be secured to the inner side of the first rim member 101 and the second rim member 102 in the tire width direction using, for example, bolts.

In the present embodiment, the grounding deformable portion 20 is configured with members including elastic deformable portions. In the present embodiment, as illustrated in FIG. 2, the grounding deformable portion 20 includes two kinds of members: body springs 201 and interlink springs 211. The body springs 201 and the interlink springs 211 are made of metal.

Figure 4:
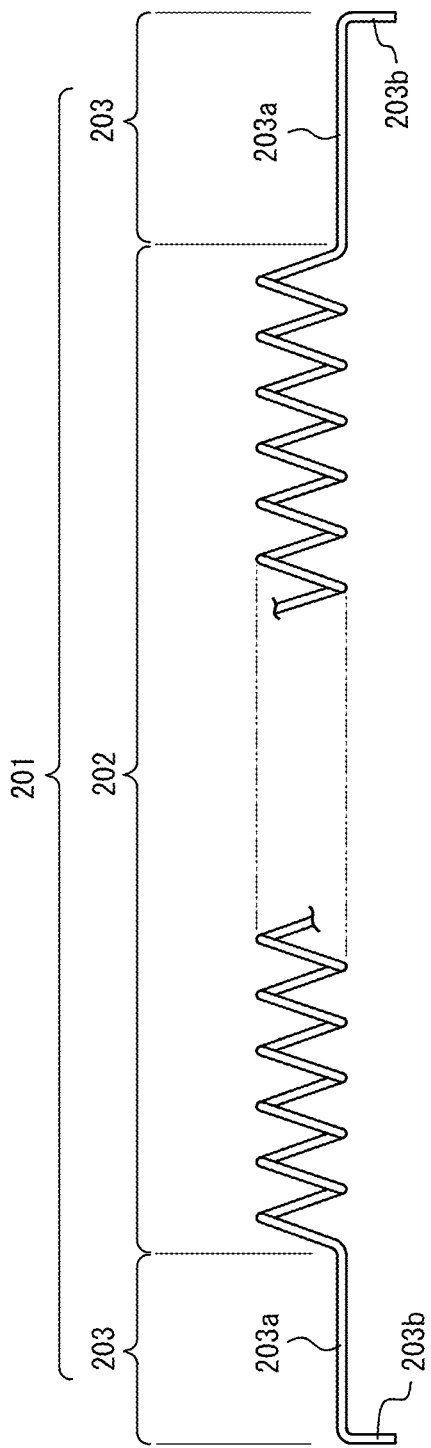
FIG. 4 is a schematic diagram illustrating an example of a body spring that configures a grounding deformable portion of FIG. 2.

FIG. 4 is a schematic diagram illustrating an example of the body spring 201 that configures the grounding deformable portion 20 of FIG. 2. The body springs 201 connect between the plurality of rim members. In the present embodiment, the body springs 201 connect between the first rim member 101 and the second rim member 102. In a case in which the skeleton portion 2 has three or more rim members, the body springs 201 may connect at least one of spaces between the adjacent rim members, though it is preferable that the body springs 201 connect the respective spaces between the adjacent rim members in a manner similar to the manner of connecting between the first rim member 101 and the second rim member 102 described herein. As illustrated in FIG. 4, the body spring 201 has an elastic deformable portion 202 and latch portions 203.

In the present embodiment, the elastic deformable portion 202 is constituted of a coil spring. Here, the coil spring refers to a spring that deforms elastically in response to a load and is coiled (spirally wound) around a predetermined axis. The elastic deformable portion 202 that is made of a suitable material and has appropriate elasticity can be used according to the size and weight of the tire 1, required properties of the grounding deformable portion 20, and the like.

The latch portions 203 are provided at both ends of the elastic deformable portion 202. The latch portions 203 latch the body spring 201 to the wheel portion 10. The latch portions 203 have a different shape from the elastic deformable portion 202. That is, in the present embodiment, the latch portions 203 have a shape different from a coil shape.

In the present embodiment, the latch portions 203 are constituted of members integral with the elastic deformable portion 202. That is, in the present embodiment, as illustrated in FIG. 4, for example, a material composing the elastic deformable portion 202 extends from both the ends of the elastic deformable portion 202 to configure the latch portions 203.

In the present embodiment, as illustrated in FIG. 4, for example, the latch portions 203 include straight portions 203a that are formed in a linear shape and are joined to both the ends of the elastic deformable portion 202. Also in the present embodiment, as illustrated in FIG. 4, for example, the latch portions 203 include, at tip ends of the straight portions 203a, bent portions 203b that are bent with respect to the straight portions 203a. In the present embodiment, the bent portions 203b are bent orthogonally with respect to the straight portions 203a in a side view of the body spring 201 (in a plane containing an axis of the body spring 201).

Figure 5:
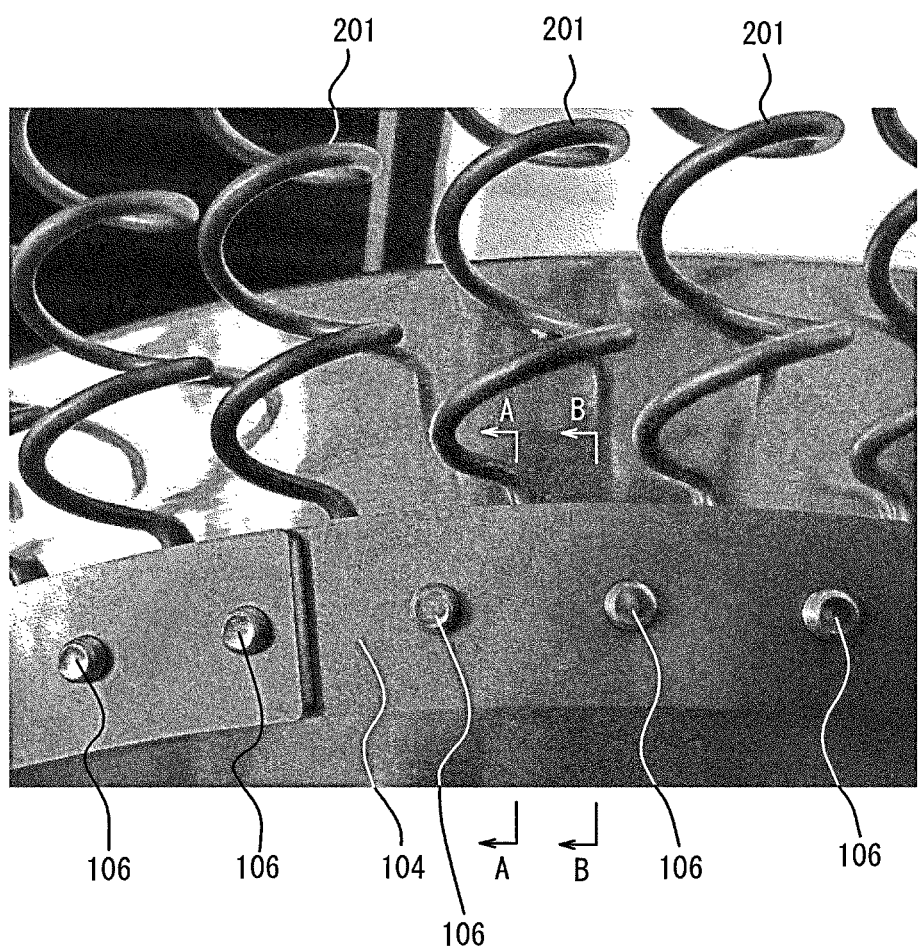
FIG. 5 is a schematic diagram illustrating an example of an aspect of engaging the body springs with the rim member.
Figure 6:
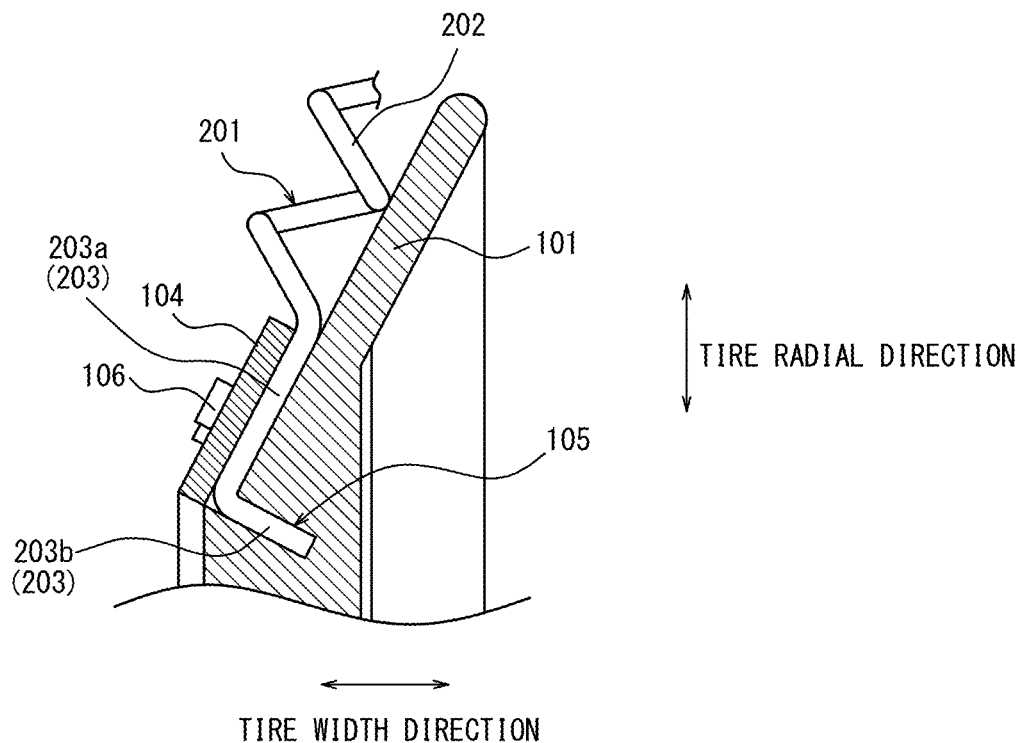
FIG. 6 is a cross sectional view along the line A-A of FIG. 5.
Figure 7:
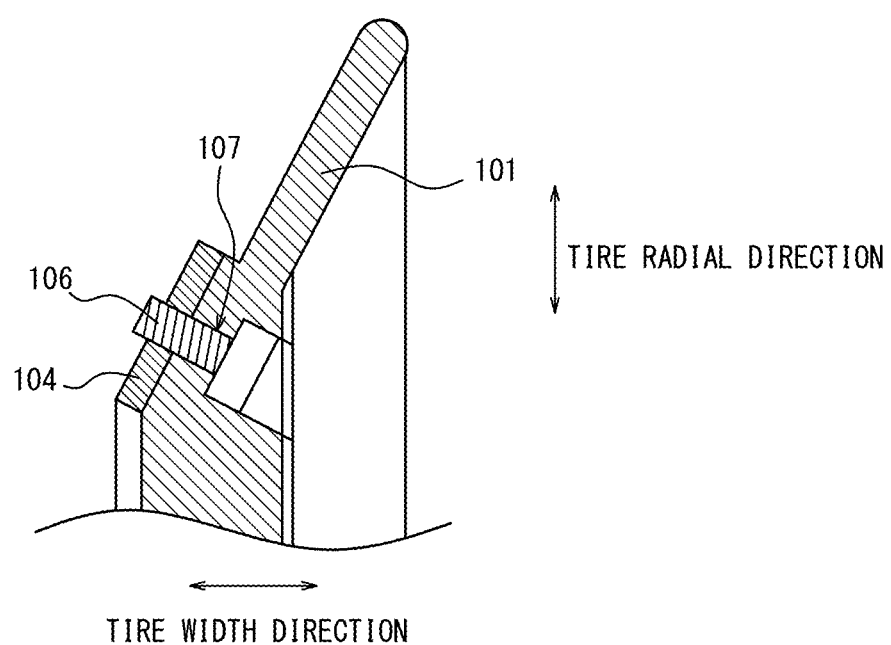
FIG. 7 is a cross sectional view along the line B-B of FIG. 5.

Referring to FIGS. 5 to 7, an aspect of engaging the body springs 201 in the wheel portion 10 according to the present embodiment will be described in detail. One of the latch portions 203 provided at both the ends of the body spring 201 is engaged in the first rim member 101, and the other latch portion 203 is engaged in the second rim member 102. An example of a case in which one of the latch portions 203 is engaged in the first rim member 101 will be described here, but the other latch portion 203 can be engaged in the second rim member 102 in the same manner.

FIG. 5 is a schematic diagram illustrating an example of an aspect of engaging the body springs 201 in the first rim member 101, in which an engagement state of the body springs 201 is viewed from the inner side of the first rim member 101 in the tire width direction. FIG. 5 illustrates only part of the first rim member 101 in which the body springs 201 are engaged, but the body springs 201 are practically engaged, as illustrated in FIG. 5, over the entire circumference of the first rim member 101 in the first rim member 101.

In the present embodiment, as illustrated in FIG. 5, the body springs 201 can be engaged in the first rim member 101 by engaging the latch portions 203 in the engagement receiving portions 105 provided in a surface of the first rim member 101 on the inner side in the tire width direction. In the present embodiment, in particular, the engagement receiving portion 105 is configured as a hole into which the bent portion 203b of the latch portion 203 is insertable. Inserting the bent portions 203b into the holes of the engagement receiving portions 105 allows the body springs 201 to be engaged in the first rim member 101. In a state of engaging the latch portions 203 in the engagement receiving portions 105, the support member 104 is attached to the inner side of the first rim member 101 in the tire width direction in order to firmly secure the engagement state of the latch portions 203.

FIG. 6 is a cross sectional view taken on the line A-A of FIG. 5, and specifically, a cross sectional view of the first rim member 101 at a point including the engagement receiving portion. As illustrated in FIG. 6, the first rim member 101 has the engagement receiving portion 105. In the present embodiment, the engagement receiving portion 105 is configured as a hole into which the bent portion 203b is insertable. In the present embodiment, the engagement receiving portion 105 is configured as a bottomed hole. The length of the hole (depth of the hole) of the engagement receiving portion 105 in an extending direction is preferably longer than the length of the bent portion 203b. As a result, the entire bent portion 203b can be inserted into the engagement receiving portion 105, and the engagement state becomes more stable. However, the engagement receiving portion 105 may be configured as a bottomless hole (through hole).

The shape of cross section of the hole of the engagement receiving portion 105 is not limited as long as the bent portion 203b is insertable thereinto, and may be, for example, an ellipse, an oval, a rectangle, a polygon, or the like. In order to latch (secure) the elastic deformable portion 202 more reliably, it is preferable that the shape and size of cross section of the hole are approximately the same as the shape and size of cross section of the bent portion 203b.

The body spring 201 is arranged such that, in a state of inserting the bent portion 203b into the engagement receiving portion 105, the elastic deformable portion 202 is positioned, except for at least part, at a radially outer side (upper side in FIGS. 6 and 7) of the tire 1 of the annular first rim member 101. In this state, the support member 104 is attached to the inner side (left side in FIGS. 6 and 7) of the first rim member 101 in the tire width direction. The support member 104 is attached, as illustrated in FIG. 6, for example, to such a position as to retain the bent portion 203b inserted into the hole of the engagement receiving portion 105, i.e., such a position as to prevent the bent portion 203b from slipping out of the hole of the engagement receiving portion 105. The support member 104 is preferably attached in such a position as to block the hole of the engagement receiving portion 105 in a state of not inserting the body spring 201. Also, as illustrated in FIG. 6, for example, the support member 104 is secured to the first rim member 101 so as to retain the straight portion 203a of the latch portion 203 on the inner surface of the first rim member 101 in the tire width direction. In this manner, the engagement state of the latch portion 203 is stably secured by the support member 104.

The support member 104 is attached to the first rim member 101 using, for example, bolts 106. FIG. 7 is a cross sectional view of FIG. 5 taken on the line B-B, and specifically, a cross sectional view of the first rim member 101 at a point including the bolt 106 for securing the support member 104. As illustrated in FIG. 7, the support member 104 is secured to the first rim member 101 by the bolt 106. As illustrated in FIG. 5, the support member 104 may be secured to the first rim member 101 at a position between (in the middle of) the two body springs 201 that are engaged in the first rim member 101. That is, in the first rim member 101, one bolt hole 107 for securing the bolt 106 is formed between the two adjacent engagement receiving portions 105 in a circumferential direction of the annular first rim member 101. Thereby, it is possible to secure the support member 104 to the first rim member 101 without interfering with engagement positions of the body springs 201.

As illustrated in FIGS. 5 to 7, the bolt 106 may be provided such that a threaded end of the bolt 106 protrudes inward in the tire width direction of the wheel portion 10, relative to an inner surface of the support member 104 in the tire width direction. The threaded end of the bolt 106, which protrudes inward in the tire width direction of the wheel portion 10 relative to the inner surface of the support member 104 in the tire width direction, may be used to secure a securing member described below. Details of the securing member will be described later.

The support member 104 may be constituted of a single annular member or as a plurality of divided members that form an annular shape in their entirety. In such a case, the support members 104 may be disposed so as to contact each other at their ends in the circumferential direction, or may be arranged with leaving appropriate clearances. In a case in which the support member 104 is constituted of the plurality of divided members, each member has, for example, the shape of a sector.

In the present embodiment, over the entire circumference of the first rim member 101, one of the latch portions 203 (more specifically, the bent portions 203b) of each of the body springs 201 is engaged in the engagement receiving portion 105 of the first rim member 101, and the support member 104 is secured to the first rim member 101, in the above-described aspect. In this manner, the latch portions 203 are latched on the first rim member 101. In a similar manner, over the entire circumference of the second rim member 102, the other latch portion 203 (more specifically, the bent portion 203b) of each of the body springs 201 is engaged in an engagement receiving portion of the second rim member 102, and the support member 104 is secured to the second rim member 102. In this manner, the latch portions 203 are latched on the second rim member 102. In the present embodiment, one and the other latch portions 203 of one body spring 201 may be engaged, in the first rim member 101 and the second rim member 102, in the engagement receiving portions that are positioned on a straight line in an axial direction of the first rim member 101 and the second rim member 102. In other words, in the present embodiment, two latch portions 203 of one body spring 201 may be secured to the first rim member 101 and the second rim member 102 at the same position with respect to the circumferential direction. Therefore, the body spring 201 extends in a direction parallel to the axial direction of the wheel portion 10 and a direction orthogonal to the circumferential direction of the wheel portion 10. However, the two latch portions 203 of the one body spring 201 may not necessarily be secured at the same position in the circumferential direction, with respect to the first rim member 101 and the second rim member 102.

The number and intervals of the body springs 201 to be engaged in the first rim member 101 and the second rim member 102 may be determined as appropriate according to the size and weight of the tire 1, required properties of the grounding deformable portion 20, and the like. The number and intervals of the bolts 106 used to attach the support members 104 to the first rim member 101 and the second rim member 102 may also be determined as appropriate. For example, the bolt 106 does not necessarily have to be attached to every space between two of the engagement receiving portions 105 adjacent in the circumferential direction as in the present embodiment.

Figure 8:
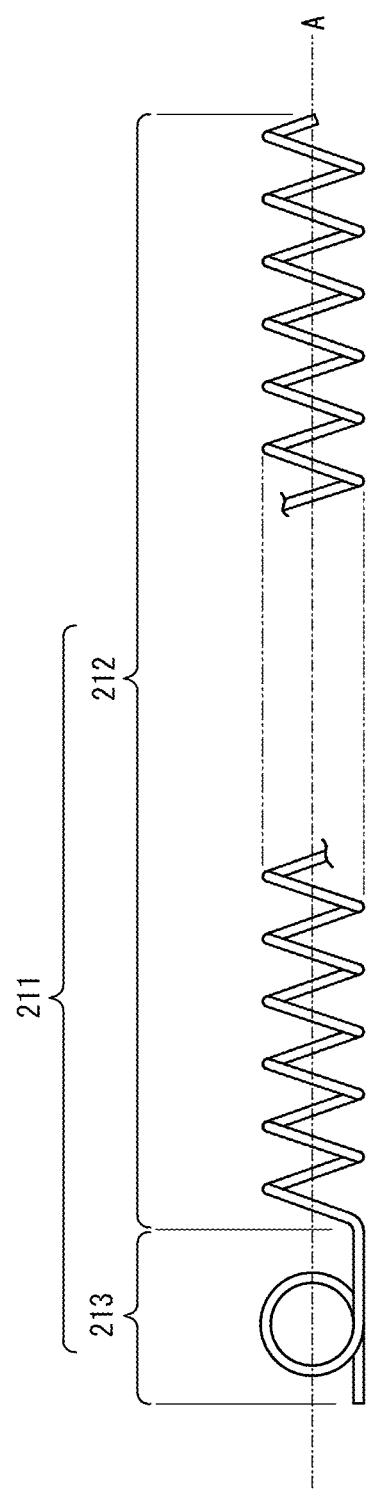
FIG. 8 is a schematic diagram of an example of an interlink spring that configures the grounding deformable portion of FIG. 2.

In the skeleton portion 2 of the tire 1 according to the present embodiment, the plurality of body springs 201, which are engaged in the wheel portion 10 in this manner, are interlinked with the interlink springs 211 to form the grounding deformable portion 20. In other words, in the present embodiment, the interlink spring 211 functions as an interlink member to interlink the adjacent body springs 201. FIG. 8 is a schematic diagram illustrating an example of the interlink spring 211 composing the grounding deformable portion 20 of FIG. 2. In the present embodiment, as illustrated in FIG. 8, the interlink spring 211 has an elastic deformable portion 212 and a limitation portion 213. Specifically, the interlink spring 211 is disposed between the two body springs 201 adjacent in the circumferential direction, which are engaged in the wheel portion 10, and is interlaced with the two body springs 201 so as to be interlinked with the body springs 201.

In the present embodiment, the elastic deformable portion 212 is constituted of a coil spring. The elastic deformable portion 212 that is made of a suitable material and has appropriate elasticity can be used according to the size and weight of the tire 1, required properties of the grounding deformable portion 20, and the like. It is preferable that the diameter of the coil spring constituting the elastic deformable portion 212 is close to the diameter of the coil spring constituting the elastic deformable portion 202 of the body spring 201. Here, the diameter of the coil spring is the diameter of a circumscribed circle in the case of viewing the coil spring from an axial direction, and the same applies hereinafter. The closer the diameter of the coil spring constituting the elastic deformable portion 212 is to the diameter of the coil spring constituting the elastic deformable portion 202 of the body spring 201, the more evenly force is applied to the grounding deformable portion 20 that is formed by interlinking the coil springs constituting the elastic deformable portions 202 with the coil springs constituting the elastic deformable portions 212 as described below. For example, both the diameter of the coil spring constituting the elastic deformable portion 202 and the diameter of the coil spring constituting the elastic deformable portion 212 can be 15 mm to 25 mm, e.g. 20 mm or the like.

In the present embodiment, the limitation portion 213 is provided at one end of the elastic deformable portion 212. No other mechanism is provided at the other end of the elastic deformable portion 212 where the limitation portion 213 is not provided, and thus the elastic deformable portion 212 has an open shape at the other end. The limitation portion 213 limits displacement of the interlink spring 211, which is to be interlinked with the body springs 201, with respect to the body springs 201. The limitation portion 213 limits displacement of the interlink spring 211 in at least one direction relative to the body springs 201. In this way, by limiting displacement of the interlink spring 211 relative to the body springs 201 by the limitation portion 213, in interlinking the interlink spring 211 with the body springs 201, as described with reference to FIGS. 9A and 9B below, the interlinked position of the interlink spring 211 is determined and secured. That is, an interlinked state of the interlink spring 211 with respect to the body springs 201 is positioned and secured. The limitation portion 213 has a different shape from the elastic deformable portion 212. That is, in the present embodiment, the limitation portion 213 has a different shape from a coil shape.

In the present embodiment, the limitation portion 213 is constituted of a member integral with the elastic deformable portion 212. That is, in the present embodiment, as illustrated in FIG. 8, for example, a material of the elastic deformable portion 212 extends from one end of the elastic deformable portion 212 to form the limitation portion 213. In an example illustrated in FIG. 8, the limitation portion 213 has a ring-shaped portion formed with a wire, which forms the elastic deformable portion 212, being bent into a ring shape. The ring-shaped portion is formed so as to have a central axis in a direction intersecting the direction of an axis A of the elastic deformable portion 212. The ring-shaped portion of the limitation portion 213 may be of any size capable of limiting displacement of the interlink spring 211. For example, the ring-shaped portion of the limitation portion 213 may be configured to have a diameter of 0.5 to 1.0 times the diameter of the elastic deformable portion 212.

Figure 9A:
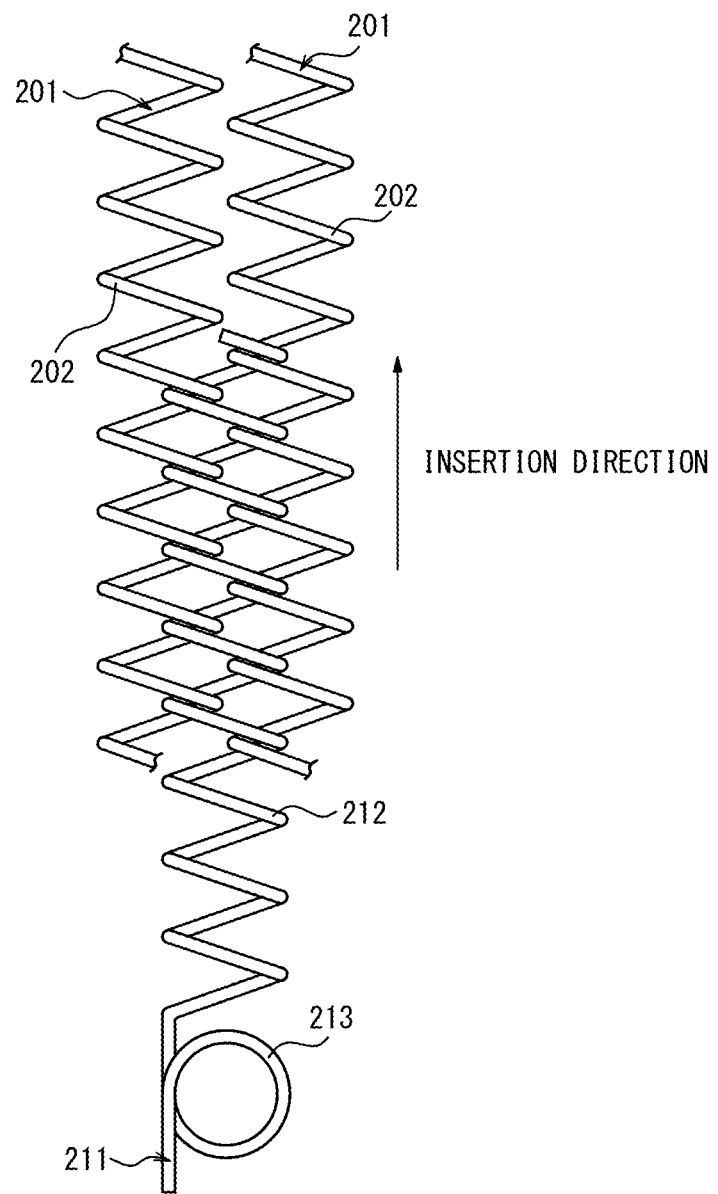
FIG. 9A is a schematic diagram illustrating an example of a method for joining the interlink spring to the body springs.

Here, the function of the limitation portion 213 will be described together with a method for interlinking the interlink spring 211 with the body springs 201. FIGS. 9A and 9B are schematic diagrams for explaining an example of the method for interlinking the interlink spring 211 with the body springs 201.

As illustrated in FIG. 9A, the interlink spring 211 is interlinked with the two adjacent body springs 201 by hooking the elastic deformable portion 212 on the elastic deformable portions 202 of the body springs 201, which are engaged in the wheel portion 10, in such a manner as to be interlaced with the two adjacent body springs 201. Specifically, the interlink spring 211 is interlinked with the body springs 201 so as to restrict the relative displacement between the two body springs 201 adjacent in the circumferential direction. At this time, the interlink spring 211 is gradually interlaced with the two adjacent body springs 201 by being inserted into the body springs 201 in such a manner as to move forward while rotating, from the side of the other end on which the limitation portion 213 is not provided.

As the entire elastic deformable portion 212 of the interlink spring 211 is interlaced with the body springs 201, as illustrated in FIG. 9B, the limitation portion 213 eventually comes into contact with the body spring 201. The limitation portion 213, due to its shape, cannot be interlaced with the body springs 201. Therefore, the interlink spring 211 does not move in an insertion direction beyond the position at which the limitation portion 213 contacts the body spring 201. In particular, the interlink spring 211 does not move forward (move in the insertion direction) after the ring-shaped portion of the limitation portion 213 contacts the body spring 201, even if the interlink spring 211 is attempted to be moved forward while being rotated. Thus, the limitation portion 213 limits displacement of the interlink spring 211 in at least one direction relative to the body springs 201. In this manner, the limitation portion 213 positions and secures an interlinked state of the interlink spring 211 with respect to the body springs 201. In addition, the interlink spring 211 interlinked with the body springs 201 is prevented from coming off from the body springs 201.

It is preferable that at least one of the two ends of the interlink spring 211 is not secured to the wheel portion 10. In the present embodiment, neither of the ends of the interlink spring 211 is secured to the wheel portion 10. In other words, in the present embodiment, the interlink spring 211 is not secured at either end. However, only one of the ends of the interlink spring 211 may be secured to the wheel portion 10. In this case, the other end of the interlink spring 211, which is opposite to the one end of the interlink spring 211 on which the limitation portion 213 is provided, is secured to the rim member.

In the present embodiment, all the body springs 201, which are engaged in the wheel portion 10, are interlinked with the interlink springs 211 each disposed between the two adjacent body springs 201. In the present embodiment, the skeleton portion 2 is configured in this manner. In other words, in the present embodiment, every body spring 201 of the grounding deformable portion 20 of the skeleton portion 2 is interlinked with the two interlink springs 211, and every interlink spring 211 of the grounding deformable portion 20 of the skeleton portion 2 is interlinked with the two body springs 201. Accordingly, the interlink springs 211 are each interlinked between the two adjacent body springs 201, so even in the case of applying a load to the skeleton portion 2, the distance between the body springs 201 does not widen too much, and function as the tire 1 can be easily maintained.

The interlink spring 211 that joins the two body springs 201 can be inserted from the side of the first rim member 101 or from the side of the second rim member 102 in the axial direction of the wheel portion 10 (i.e. the direction of a rotational axis of the tire 1). It is preferable that half of the plurality of interlink springs 211 in the skeleton portion 2 are inserted from the side of the first rim member 101, and the other half thereof are inserted from the side of the second rim member 102. This means that the limitation portions 213 of the interlink springs 211 are evenly arranged on both sides in the axial direction of the skeleton portion 2, thus easily striking a balance of the skeleton portion 2 and preventing the limitation portions 213 from being congested in only one direction in the axial direction of the skeleton portion 2. In particular, the plurality of interlink springs 211 are more preferably inserted such that the interlink springs 211 that are adjacent to each other in a circumferential direction of the grounding deformable portion 20 are inserted from different directions. This further facilitates striking a balance of the skeleton portion 2.

The skeleton portion 2 may also be provided with a connection member that connects the ring-shaped portions of the limitation portions 213 of the plurality of interlink springs 211. The connection member is constituted of a wire, for example. For example, suppose that half of the plurality of interlink springs 211 are inserted from the side of the first rim member 101 and the other half thereof are inserted from the side of the second rim member 102. In this case, the limitation portions 213 of the interlink springs 211 inserted from the side of the first rim member 101 are located on the side of the first rim member 101, and the limitation portions 213 of the interlink springs 211 inserted from the side of the second rim member 102 are located on the side of the second rim member 102. In this case, the skeleton portion 2 may have two wires, that is, a wire for connecting the ring-shaped portions of the plurality of limitation portions 213 located on the side of the first rim member 101 and a wire for connecting the ring-shaped portions of the plurality of limitation portions 213 located on the side of the second rim member 102. The wire for connecting the ring-shaped portions of the plurality of limitation portions 213 located on the side of the first rim member 101 is provided, for example, along the circumferential direction of the wheel portion 10 so as to pass through central portions (openings formed by the ring-shaped portions) of all the ring-shaped portions of the plurality of limitation portions 213 located on the side of the first rim member 101. Similarly, the wire for connecting the ring-shaped portions of the plurality of limitation portions 213 located on the side of the second rim member 102 is provided, for example, along the circumferential direction of the wheel portion 10 so as to pass through central portions of all the ring-shaped portions of the plurality of limitation portions 213 located on the side of the second rim member 102. Such a wire is formed in a circular shape, for example, and therefore can connect the ring-shaped portions of the limitation portions 213 by passing through the central portions of the ring-shaped portions of the limitation portions 213. Thus, the provision of the wires, which pass through the ring-shaped portions of the plurality of limitation portions 213, limits displacement of the relative positions of the limitation portions 213. As a result, the interlink springs 211 that are interlinked with the body springs 201 are further prevented from coming off from the body springs 201.

However, the connection member for connecting the ring-shaped portions of the plurality of limitation portions 213 of the plurality of interlink springs 211 need not necessarily be configured to pass through the ring-shaped portions of the plurality of limitation portions 213 as described above, and the limitation portions 213 may be connected to each other by any form. In this case, for example, the connection member may be secured to each of the ring-shaped portions of the plurality of limitation portions 213 to be connected, thereby connecting the ring-shaped portions of the plurality of limitation portions 213. By providing at least the wire for connecting the limitation portions 213 of the plurality of interlink springs 211, displacement of the relative positional relationship between the interlink springs 211 connected by the wire is limited.

In the above embodiment, it is described that the limitation portion 213 is formed in a ring shape having a central axis in a direction intersecting the direction of the axis A of the elastic deformable portion 212, but the shape of the limitation portion 213 is not limited thereto. The limitation portion 213 may have any configuration capable of limiting displacement of the interlink spring 211 in at least one direction relative to the body springs 201.

Figure 10:
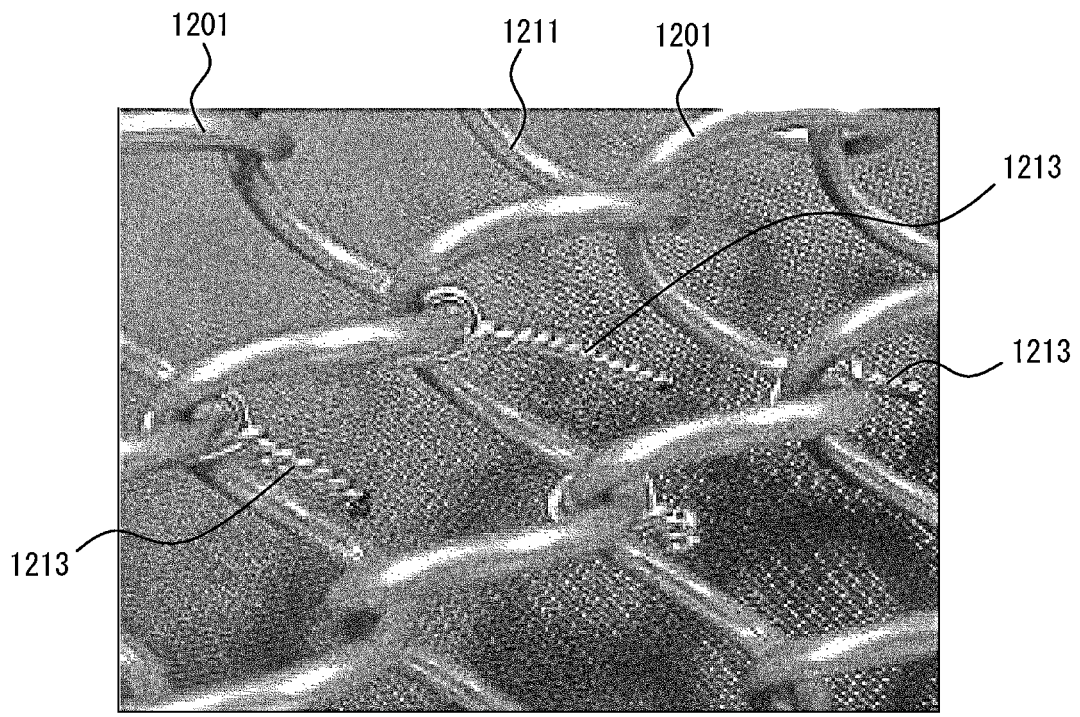
FIG. 10 is a schematic diagram illustrating a variation of a limitation portion.

In the above embodiment, it is described that the limitation portion 213 is constituted of a member integral with the elastic deformable portion 212, but the limitation portion 213 does not necessarily have to be constituted of a member integral with the elastic deformable portion 212. For example, as schematically illustrated in FIG. 10, a limitation portion 1213 that is constituted of a member different from and independent of the interlink spring 1211 may limit displacement of the interlink spring 1211 relative to the body spring 1201. In the example illustrated in FIG. 10, the limitation portion 1213 is configured as a member different from and independent of the interlink spring 1211, for limiting displacement of a contact point between the body spring 1201 and the interlink spring 1211 that are interlaced with each other.

The length of the interlink spring 211 may be determined in appropriate according to the size and weight of the tire 1, the required properties of the grounding deformable portion 20, and the like. The interlink spring 211 is preferably configured to have the elastic deformable portion 212 that is shorter than the length of the elastic deformable portion 202 of the body spring 201. The interlink spring 211 preferably has a length such that the elastic deformable portion 212 extends over the entirety in the tire width direction. Thereby, the elastic deformable portions 202 of the body springs 201 are interlinked with the elastic deformable portions 212 of the interlink springs 211 in at least a grounding area.

The tire 1 according to the present embodiment is configured to have tread members mounted on the outer periphery of the above-described skeleton portion 2. As illustrated in FIG. 1, for example, the tread members are mounted on the skeleton portion 2 so as to extend over the entire skeleton portion 2 in tire width direction. The tread members are mounted at least on a grounding area, which is formed by the body springs 201 and the interlink springs 211, of the skeleton portion 2. The tread member may be configured to include, for example, a nonwoven fabric. The nonwoven fabric may be made of metal, for example. The use of the metallic nonwoven fabric enables the tire 1 to be used as desired in an environment where temperature largely varies. Here, description is made, supposing that the tread members are configured to include the metallic nonwoven fabric.

Figure 11:
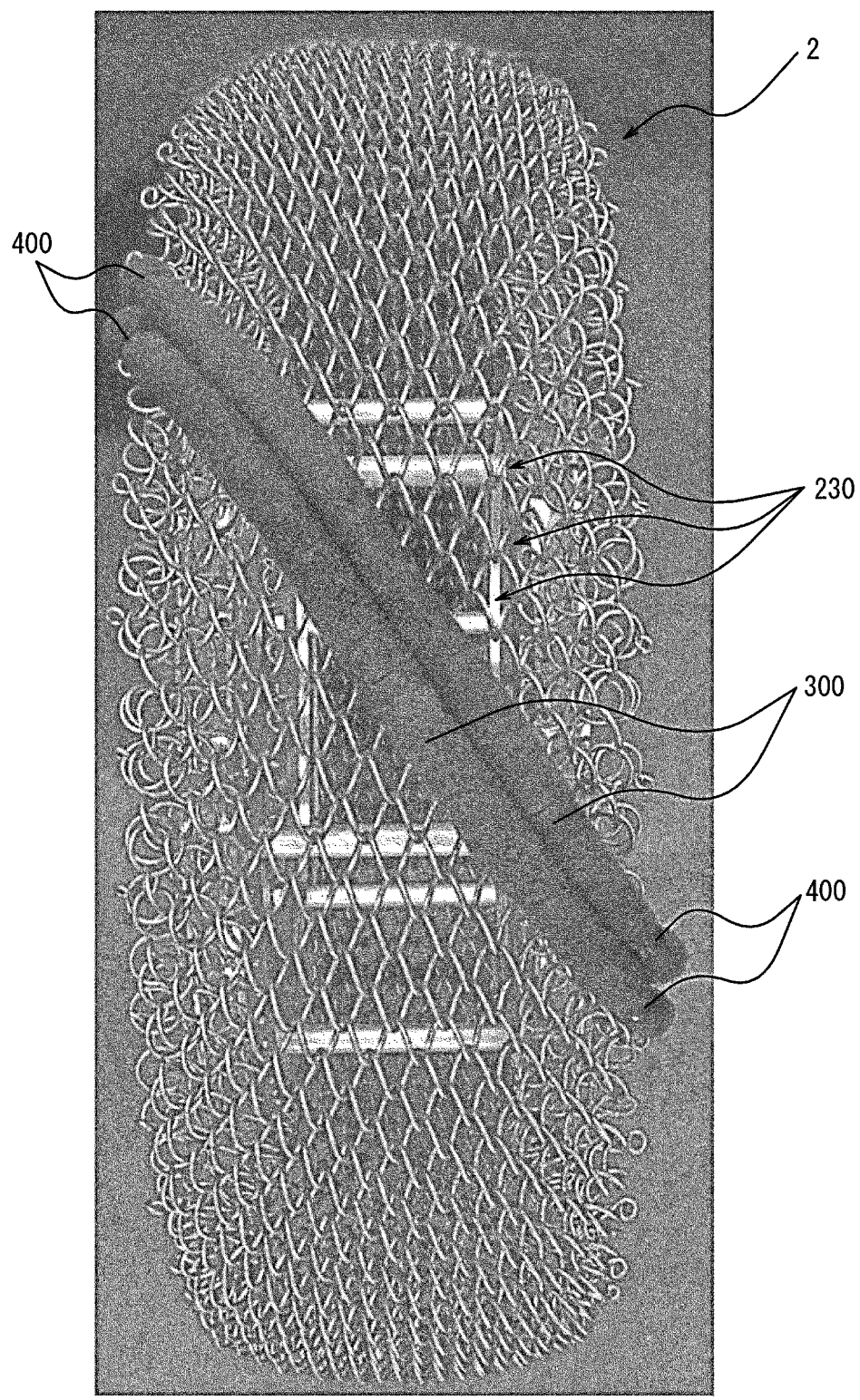
FIG. 11 is a diagram illustrating a state in which tread members are mounted on part of the skeleton portion.
Figure 12:
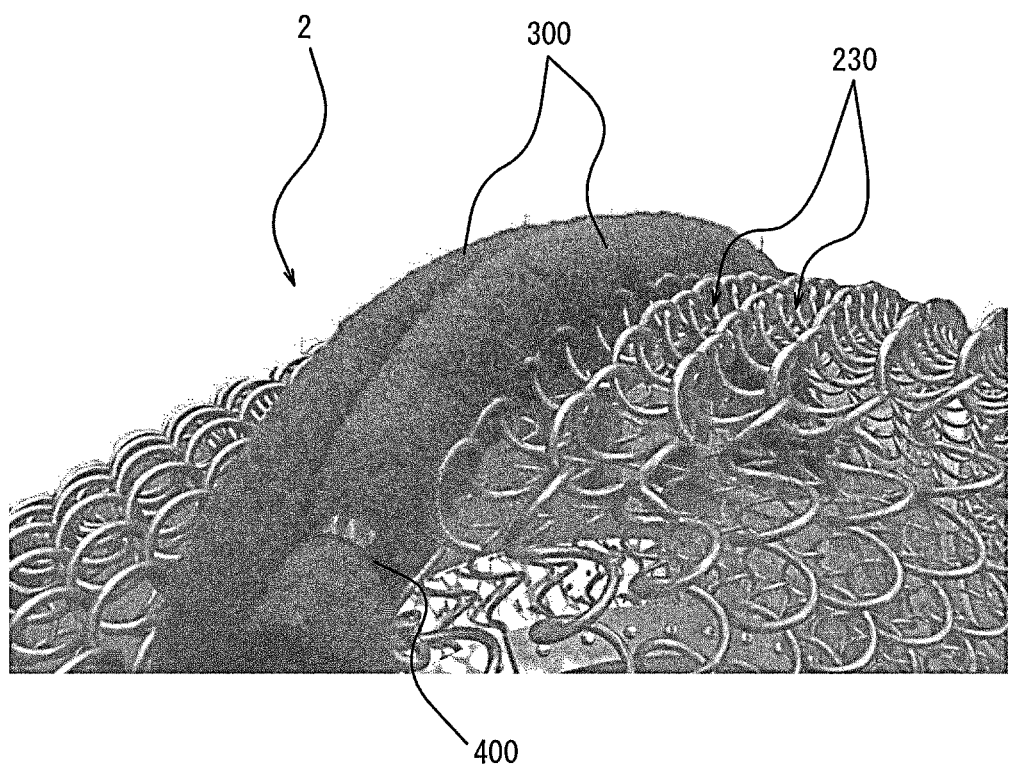
FIG. 12 is a diagram illustrating the state in which the tread members are mounted on the part of the skeleton portion.

FIGS. 11 and 12 illustrates a state in which tread members 300 are mounted on part of the skeleton portion 2. More specifically, FIG. 11 is a diagram of the skeleton portion 2 on part of which the tread members 300 are mounted, viewed from outside in a radial direction of the grounding deformable portion 20 of the skeleton portion 2, and FIG. 12 is an enlarged diagram of part of the skeleton portion 2 on part of which the tread members 300 are mounted.

As illustrated in FIGS. 11 and 12, grooves 230 are formed in the skeleton portion 2 with the body springs 201 and the interlink springs 211 interlaced with each other. As described above, in the present embodiment, the body springs 201 extend in the direction parallel to the axial direction of the wheel portion 10 and the direction orthogonal to the circumferential direction of the wheel portion 10. Therefore, the interlink springs 211 interwoven with the body springs 201 also extend in the direction parallel to the axial direction of the wheel portion 10 and the direction orthogonal to the circumferential direction of the wheel portion 10. Thus, in a case in which the body springs 201 and the interlink springs 211 extend in the direction parallel to the axial direction, as illustrated in FIGS. 11 and 12, the grooves 230 are formed so as to extend in a direction intersecting with the axial direction and the circumferential direction of the wheel portion 10.

Figure 13:
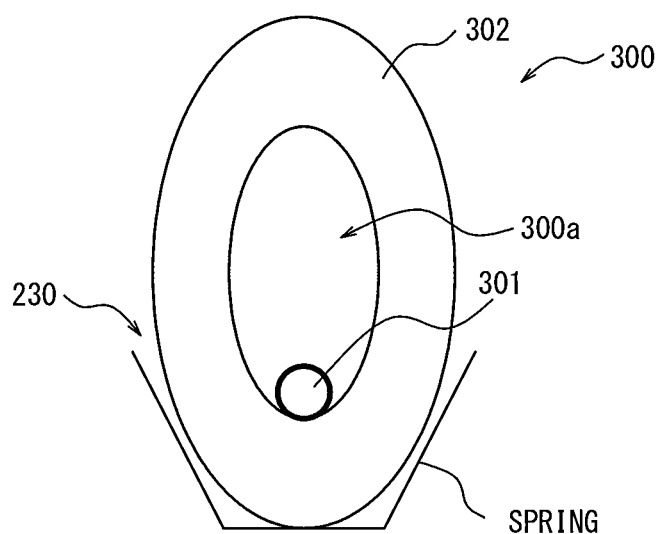
FIG. 13 is a schematic diagram illustrating a state of mounting the tread member on the skeleton portion.

In the present embodiment, as illustrated in FIGS. 11 and 12, the tread members 300 are mounted in grooves 230 formed with the body springs 201 and the interlink springs 211. At this time, as illustrated in FIG. 13, for example, the tread member 300 is mounted in such a manner that at least part of the tread member 300 is embedded in the groove 230. By mounting the tread member 300 in such a manner that at least part of the tread member 300 is embedded in the groove 230, the tread member 300 is prevented from falling out of the groove 230. In the present embodiment, only part of the tread member 300, that is, only a lower portion of the tread member 300 on an inner side in the radial direction is mounted so as to be embedded in the groove 230, and an upper portion of the tread member 300 on an outer side in the radial direction is exposed from the groove 230. In this case, vibrations and the like during driving can be suppressed. However, the tread member 300 may be mounted in such a manner that its entirety is embedded in the groove 230. In this case, the tread member 300 is prevented from falling out of the groove 230. In the present embodiment, as illustrated in FIG. 1, the tread members 300 are configured to be embedded in all the grooves 230 formed in the skeleton portion 2 and contact each other in the circumferential direction. However, the tread members 300 do not have to be embedded in all the grooves 230. For example, the tread members 300 may be embedded in only some of the grooves 230 formed in the skeleton portion 2.

In the present embodiment, it is preferable that the tread members 300 are detachably mounted on the skeleton portion 2. By detachably mounting the tread members 300 on the skeleton portion 2, the tread members 300 can be removed from the skeleton portion 2 and replaced, in a case in which the tread members 300 are worn out or the like.

In the present embodiment, as schematically illustrated in FIG. 13, for example, the tread member 300 is made of a nonwoven fabric 302. The tread member 300 can be configured in the shape of a rod having a through hole 300a in its central portion in cross section in an extending direction. The tread member 300 can be made of the nonwoven fabric 302 in the shape of an elongated rod the cross section of which is approximately a circle. Here, the approximate circle includes not only a perfect circle but also a distorted circle (e.g., an ellipse as schematically illustrated in FIG. 13) or a shape having irregularities in a circumference in cross section. The through hole 300a provided in the tread member 300 is a hole for passing a core material 301 therethrough. The core material 301 extends along the extending direction of the tread member 300. The core material 301 can be constituted of, for example, a coil spring having a fine wire diameter with a dense pitch.

Figure 14A:
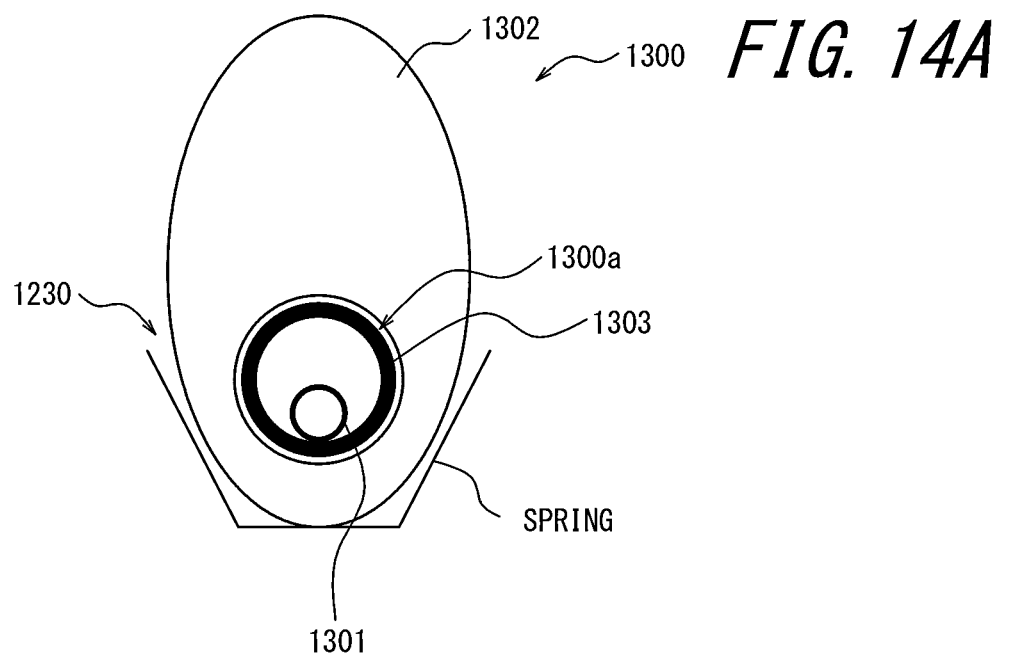
FIG. 14A is a schematic diagram illustrating a variation of the tread member.
Figure 14B:
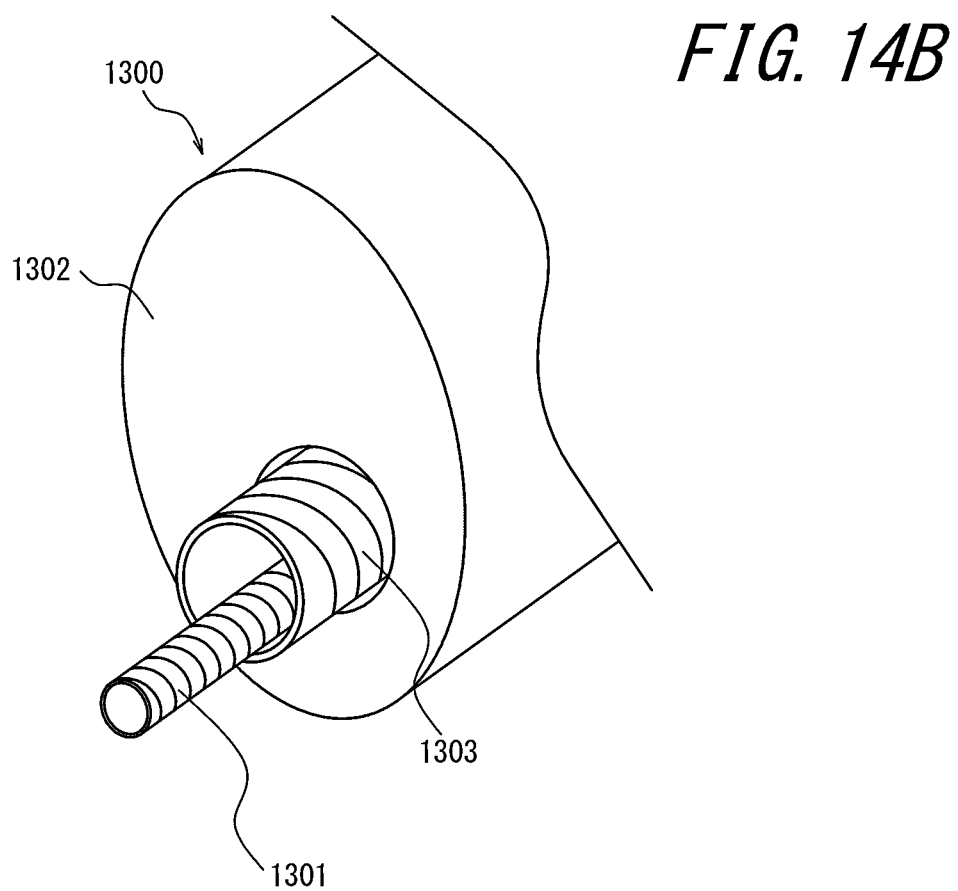
FIG. 14B is a schematic diagram illustrating the variation of the tread member.

The tread member 300 is not limited to the example illustrated in FIG. 13. For example, as illustrated in FIGS. 14A and 14B, the tread member 300 may be provided with a reinforcement member 1303 for reinforcing the through hole 1300a. The reinforcement member 1303 is formed in a cylindrical shape. The reinforcement member 1303 may be constituted of, for example, a coil spring with a dense pitch. The core material 1301 is disposed inside the cylindrical reinforcement member 1303. The provision of the reinforcement member 1303 can prevent the core material 1301 from biting into the nonwoven fabric 1302, as compared with a case in which the reinforcement member 1303 is not provided. In addition, the reinforcement member 1303 protects the core material 1301, thereby improving durability of the tread member 1300. In addition, the reinforcement member 1303 can store and retain heat transmitted from the wheel portion 10 and the like and heat emitted by the tread member 1300, thereby preventing supercooling of the tread member 1300 in an extremely low temperature environment.

Figure 15A:
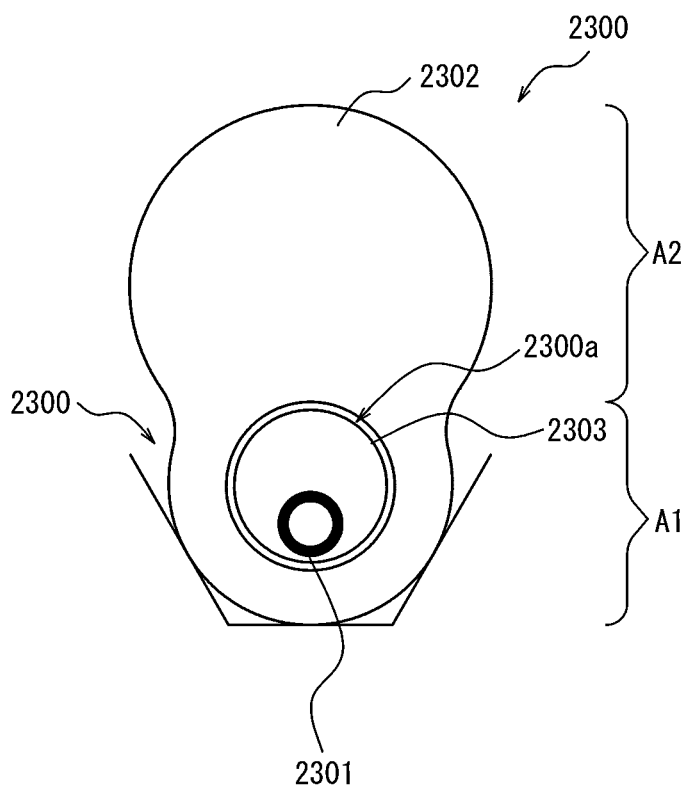
FIG. 15A is a schematic diagram illustrating another variation of the tread member.
Figure 15B:
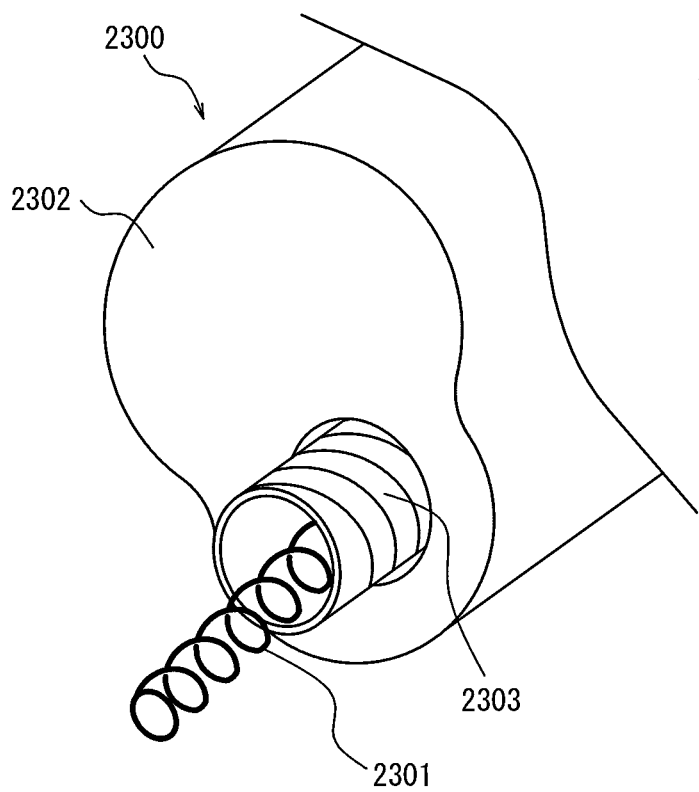
FIG. 15B is a schematic diagram illustrating the variation of the tread member.

The tread member 300 may have a gourd shape in cross section, as illustrated in FIGS. 15A and 15B, for example. In this case, the tread member 2300 has a secured area A1 to be embedded in the groove 230 and a grounding area A2 to be grounded. The grounding area A2 is provided outside the secured area A1 in the radial direction of the tire 1. In the tread member 2300, a through hole 2300a is provided in the secured area A1, and a reinforcement member 2303 is provided in the through hole 2300a. A core material 2301 is disposed inside the reinforcement member 2303. In cross section, the width of the grounding area A2 is larger than the width of the secured area A1. Also, the length of the grounding area A2 in the radial direction of the tire 1 is longer than the length of the secured area A1 in the radial direction of the tire 1.

In the present embodiment, the tread member 300 is preferably further provided with a securing member for securing the tread member 300 to the skeleton portion 2. This further prevents the tread member 300 from falling off from the skeleton portion 2.

For example, in a case in which the tread member 300 is configured in the rod shape, as in the example illustrated in FIG. 13, the tread member 300 may be provided with securing members extending from both ends of the rod-shaped tread member 300 in the extending direction of the tread member 300. For example, the tread member 300 may be provided with securing members extending in an extending direction of the core material 301. In this case, the core material 301 and the securing members may be configured as an integral member. Specifically, a coil spring having functions as the core material 301 and the securing members is inserted into the through hole 300a and is secured to the skeleton portion 2, thereby securing the tread member 300 to the skeleton portion 2. At least one coil spring is used, and a plurality of coil springs may be used.

Figure 16:
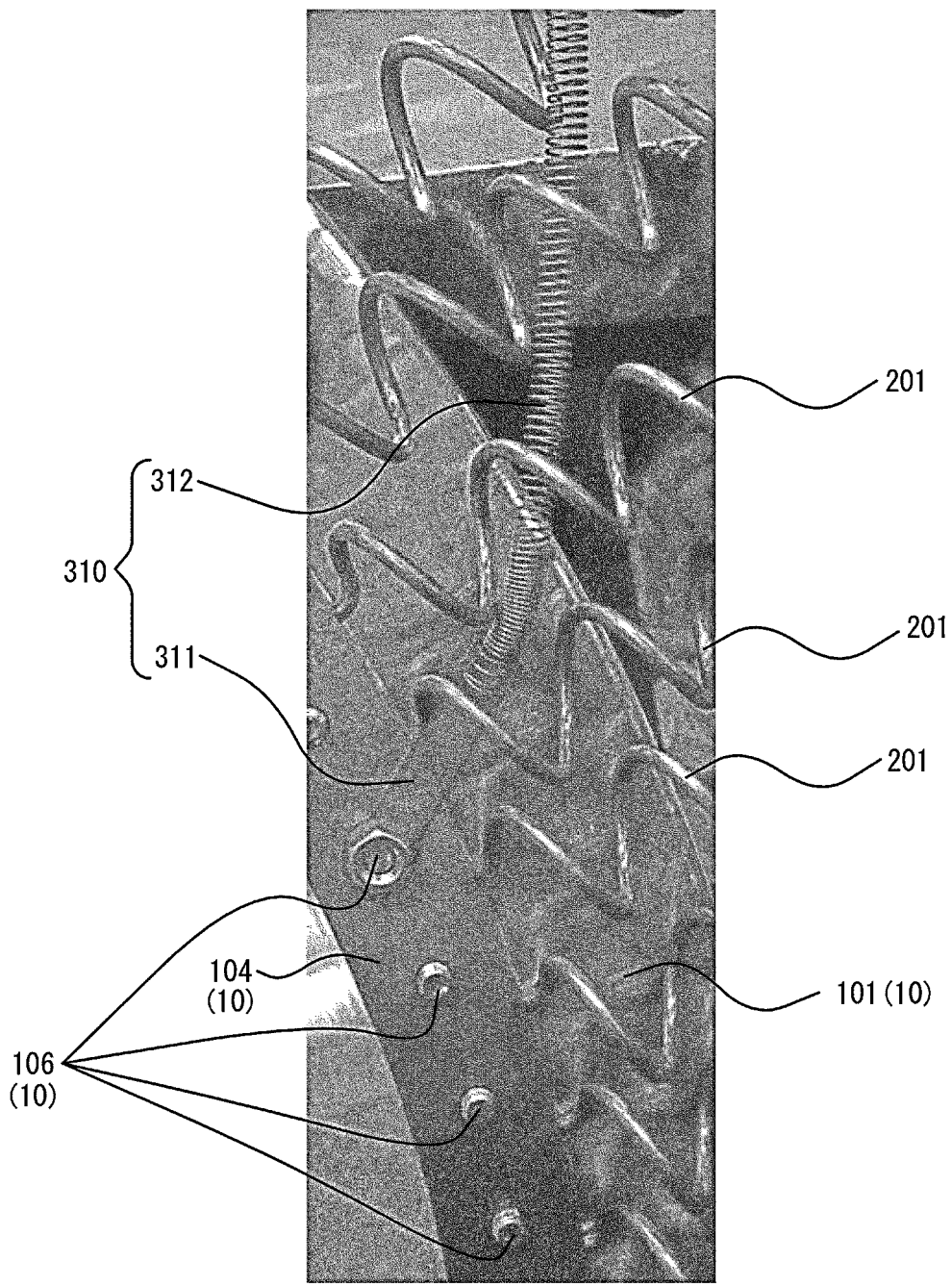
FIG. 16 is a schematic diagram illustrating an example of an aspect of securing the tread member to the rim member with a securing member.

The securing member has, for example, a mechanism capable of being secured to the wheel portion 10. As one specific example, as illustrated in FIG. 16, for example, a securing member 310 has a mechanism capable of being secured to the threaded end of the bolt 106 protruding inside the wheel portion 10, and can be secured to the wheel portion 10 by securing the mechanism to the threaded end of the bolt 106. In this case, the securing member 310 includes, as illustrated in FIG. 16, a secured portion 311 that is secured to the threaded end of the bolt 106 and a joint portion 312 that joins between the above-described core material 301 (omitted in the drawing) and the secured portion 311. The joint portion 312 is constituted of a coil spring, for example.

In the above example, the reinforcement member 303 is preferably made of a coil spring whose wire diameter of strands is thinner than that of the joint portion 312 of the securing member 310 and whose pitch is denser. The strands of the joint portion 312 preferably have a wire diameter of 0.5 mm or more, for example. A helical angle of the joint portion 312 is preferably from 5° to 50°. This facilitates moderate absorption of a load on the tread member 300, while maintaining a joint state between the secured portion 311 and the core material 301.

The tire 1 according to the present embodiment is preferably further provided with a retainer to maintain a mounted state of the tread member 300 on the skeleton portion 2. This further prevents the tread member 300 from falling off from the skeleton portion 2.

Figure 17A:
FIG. 17A is an external view illustrating an example of a retainer.
Figure 17B:
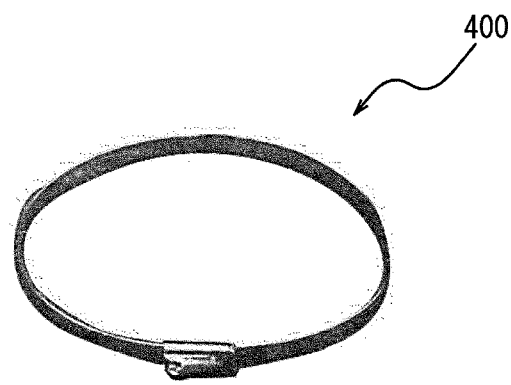
FIG. 17B is an external view illustrating the example of the retainer.

A retainer 400 may be a member that is formed in the shape of an elongated strip, as illustrated in FIG. 17A, for example, and that can be secured in an annular shape by joining and securing its ends together, as illustrated in FIG. 17B, for example. By securing the retainer 400 in the annular shape in a state of integrating the tread member 300 and the body springs 201 and/or the interlink springs 211, as illustrated in FIGS. 11 and 12, the tread member 300 can be secured to the grounding deformable portion 20 (the body springs 201 and/or the interlink springs 211). The mounted state of the tread member 300 on the skeleton portion 2 (more specifically, the body springs 201 and/or the interlink springs 211 in the present embodiment) can be maintained by retaining the tread member 300 at one or more points per tread member 300 by one or more retainers 400. An aspect of the retainer 400 is not limited thereto, and the retainer 400 may have any aspect that can maintain the mounted state of the tread member 300 on the skeleton portion 2.

As described above, the tire 1 according to the present embodiment is provided with the tread member 300 disposed at least on the outer periphery of the skeleton portion 2. Therefore, even in a case in which the tire 1 according to the present embodiment is used on, for example, sandy ground or the like, the tread member 300 can prevent foreign matter such as sand from entering the interior (that is, the side of the center of rotation) of the tire 1. This serves to prevent deterioration in running performance of the tire 1.

Thus, according to the tire 1 of the present embodiment, each of the plurality of body springs 201, which configure the grounding deformable portion 20, has the elastic deformable portion 202 and the latch portions 203 that are provided at both ends of the elastic deformable portion 202 and have a shape different from the elastic deformable portion 202. The latch portions 203 are latched on the first rim member 101 and the second rim member 102. Accordingly, the body springs 201 can be reliably joined to the first rim member 101 and the second rim member 102. This effect, for example, makes it difficult for the body springs 201 to come off from the first rim member 101 and the second rim member 102, even if the tire 1 is used in a special environment. Also, for example, if the elastic deformable portions 202 of the body springs 201 are directly joined to the first rim member 101 and the second rim member 102, the elastic deformable portions 202 may easily fall off from the first rim member 101 and the second rim member 102, depending on a method of joining or due to the wearing away of the elastic deformable portions 202. In contrast to this, in the present embodiment, such a fear is less likely to occur because the latch portions 203 of a different shape from the elastic deformable portions 202 are latched. Furthermore, even in a case in which the tire 1 according to the present embodiment is used, for example, on a lunar surface where temperature largely varies, the body springs 201 are engaged in the engagement receiving portions 105 of the first rim member 101 and the second rim member 102, so the occurrence of thermal expansion or thermal contraction in the first and second rim members 101 and 102 or the body springs 201 does not cause the body springs 201 to come off from the first rim member 101 and the second rim member 102, thus facilitating maintaining the form and function of the tire 1.

In addition, in a case in which the first rim member 101 and the second rim member 102 have the engagement receiving portions 105, and the latch portions 203 of the body springs 201 are latched on the engagement receiving portions 105, as in the present embodiment, the body springs 201 can be more reliably joined to the first rim member 101 and the second rim member 102.

In addition, in a case in which a latched state of the latch portions 203 is maintained using the support members 104, as in the present embodiment, the body springs 201 are further prevented from coming off from the first rim member 101 and the second rim member 102. Therefore, the plurality of body springs 201 can be more reliably engaged in the engagement receiving portions 105 of the first rim member 101 and the second rim member 102.

In the above embodiment, it is described that the latch portions 203 of the body spring 201 is configured to each include the straight portion 203a and the bent portion 203b disposed at the tip end of the straight portion 203a. However, the configuration of the latch portions 203 is not necessarily limited thereto. The latch portions 203 may have any shape that is different from the shape of the elastic deformable portion 202 and is capable of being latched on the first rim member 101 and the second rim member 102. The engagement receiving portions 105 of the first rim member 101 and the second rim member 102 may also have any configuration, corresponding to the configuration of the latch portions 203. For example, the latch portions 203 may be formed in a linear shape. In this case, the first rim member 101 and the second rim member 102 may be provided with engagement receiving portions in which the linear latch portions 203 can be engaged, or the latch portions 203 may simply be secured by the support members 104.

The latch portions 203 are not limited to the examples described herein, and may have any configuration capable of latching the body spring 201 on the first rim member 101 and the second rim member 102. For example, the latch portions 203 may be each formed in a hook shape.

For example, in the above embodiment, it is described that the bent portion 203b of the latch portion 203 of the body spring 201 is bent orthogonally to the straight portion 203a. However, the bent portion 203b does not necessarily have to be orthogonal to the straight portion 203a. The bent portion 203b may be bent at a predetermined angle with respect to the straight portion 203a. In this case, the engagement receiving portion 105 may be formed as a hole provided in a direction that matches the angle of bending of the bent portion 203b.

Figure 18:
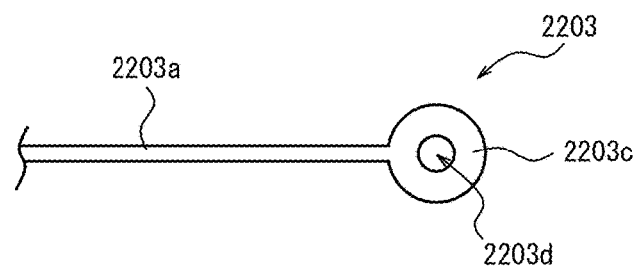
FIG. 18 is a schematic diagram illustrating a variation of a latch portion.

As illustrated in FIG. 18, the latch portion 203 of the body spring 201 may be configured to include, for example, a straight portion 2203a and a ring portion 2203c disposed at a tip end of the straight portion 2203a. The ring portion 2203c is formed in an annular shape having a through hole 2203d in its center. In this case, the engagement receiving portion 105 may be configured to be, for example, a projection that can penetrate the through hole 2203d. In this case, by penetrating the projection of the engagement receiving portion 105 through the through hole 2203d of the ring portion 2203c of the latch portion 2203, the latch portion 2203 can be latched on the engagement receiving portion 105.

Figure 19:
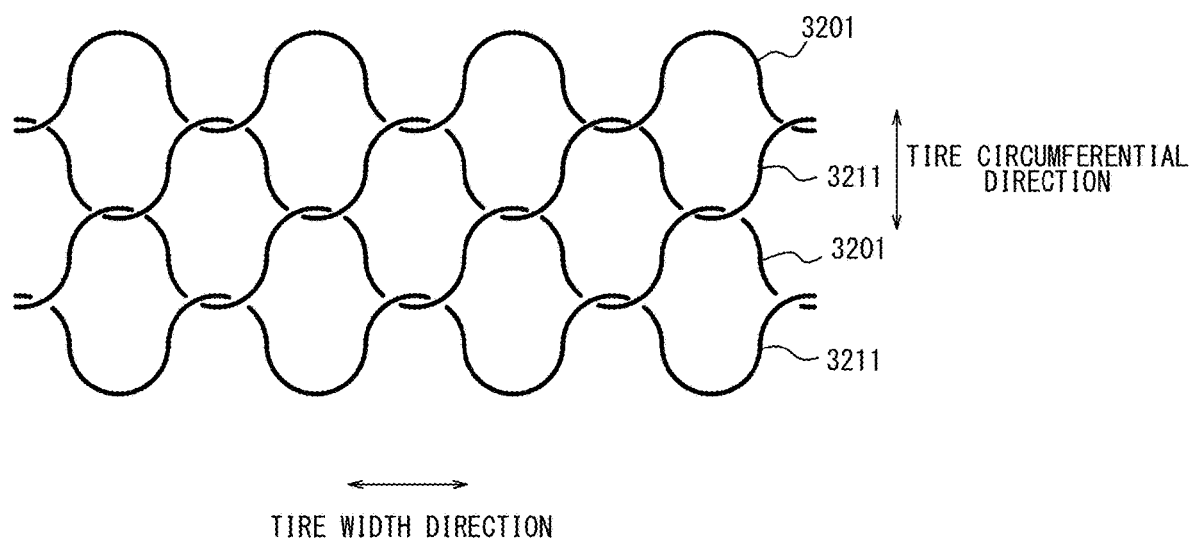
FIG. 19 is a schematic diagram illustrating a variation of the body springs and the interlink springs.

In the above embodiment, it is described that the elastic deformable portion 202 of the body spring 201 and the elastic deformable portion 212 of the interlink spring 211 are each constituted of a coil spring. However, the elastic deformable portion 202 of the body spring 201 and the elastic deformable portion 212 of the interlink spring 211 do not necessarily have to be constituted of a coil spring. For example, as illustrated in FIG. 19, the elastic deformable portion 202 of the body spring 201 and/or the elastic deformable portion 212 of the interlink spring 211 may be each configured to include a two-dimensional (i.e., extending along approximately the same plane) corrugated metal member, instead of a coil spring. FIG. 19 illustrates an example of a case in which the elastic deformable portions 202 and the elastic deformable portions 212 are each formed in a two-dimensional corrugated shape. The corrugated metal member may be, for example, in the shape of a linked semicircle or a sinusoidal waveform. Even in this case, the body springs 3201 and the interlink springs 3211 can be interlinked by interlacing the corrugated metal members.

In the above-described embodiment, it is described that the tread member 300 is configured include the metallic nonwoven fabric, but the material of the tread member 300 is not limited to the metallic nonwoven fabric. For example, the tread member 300 may be made of silicon rubber. In this case, the cushioning property and the wear resistance of the tread member 300 are improved. In addition, the traction performance of the tire 1, in running on sandy ground or the like, is improved.

For example, the tread member 300 may be made of rubber. For example, the tread member 300 may be made of natural rubber (NR) and synthetic rubber. As the synthetic rubber, there are, for example, butadiene rubber (BR), styrene-butadiene rubber (SBR), isoprene rubber (IR), butyl rubber (IIR), butyl halide rubber, chloroprene rubber (CR), acrylonitrile-butadiene rubber (NBR), ethylene-propylene-diene rubber (EPDM), and the like. One type of the rubber may be used alone, and two or more types may be used in combination.

The rubber tread member 300 may be formed in the shape of a rod, as described in the above embodiment, or may be molded in another shape. FIG. 20 is an external perspective view of an example of a rubber tread 320 that is molded in a different shape from a rod. The rubber tread 320 has, for example, as illustrated in FIG. 20, a flat plate shaped body 321 and protruding portions 322 that project from the body 321. For example, a plurality of the rubber treads 320 as illustrated in FIG. 20 are attached to the outer periphery of the grounding deformable portion 20, so the entire outer periphery of the grounding deformable portion 20 is covered with the plurality of the rubber treads 320. The protruding portions 322 are configured in such a shape that can be embedded in the grooves 230 formed by the body springs 201 and the interlink springs 211. By embedding the protruding portions 322 in the grooves 230, the rubber tread 320 can be attached to the outer periphery of the grounding deformable portion 20. Each of the protruding portions 322 is provided with a through hole 322a for penetrating a core material having a function similar to that of the core material 301 described above. The rubber tread 320 can improve gription in the tread member 300.

In the above embodiment, it is described that the body springs 201 and the interlink springs 211 extend in the direction parallel to the axial direction, and the grooves 230 are formed so as to extend in an intersecting direction with respect to the axial direction and the circumferential direction of the wheel portion 10. However, the body springs 201 and the interlink springs 211 do not necessarily have to extend in the direction parallel to the axial direction. For example, the body springs 201 and the interlink springs 211 may extend in a direction intersecting the axial direction. In this case, the grooves 230 may extend in a direction along the circumferential direction of the grounding deformable portion 20 or in a direction orthogonal to the circumferential direction of the grounding deformable portion 20. The tread members 300 may be mounted on the grounding deformable portion 20 in such a manner that at least part of the tread members 300 are embedded in the grooves 230, regardless of the direction to which the grooves 230 extend.

Although the present disclosure has been described based on the drawings and examples, it is noted that a person skilled in the art can easily make various variations and modifications based on the present disclosure. Accordingly, it is noted that these variations and modifications are included in the scope of the present invention. For example, the functions and the like included in each of components and the like can be rearranged so as not to be logically inconsistent, and a plurality of components can be combined into one or divided.

REFERENCE SIGNS LIST 1 tire
2 skeleton portion
10 wheel portion
20 grounding deformable portion
101 first rim member
102 second rim member
103 connection member
104 support member
105 engagement receiving portion
106 bolt
107 bolt hole
201 body spring
202, 212 elastic deformable portion
203 latch portion
203a straight portion
203b bent portion
203c ring portion
203d through hole
211 interlink spring 213 limitation portion
230 groove
300 tread member
300a, 322a through hole
301 core material
302 nonwoven fabric
303 reinforcement member
310 securing member
311 secured portion
312 joint portion
320 rubber tread
321 body
322 protruding portion
400 retainer
A axis
A1 secured area
A2 grounding area

The invention claimed is:

1. A tire comprising:
a skeleton portion including a rim member, a plurality of body springs latched on the rim member, and a plurality of interlink springs interlaced with the body springs; and
a tread member disposed at least on an outer periphery of the skeleton portion,
wherein the tread member is configured to include a metallic nonwoven fabric.

2. The tire according to claim 1, wherein the tread member is mounted on a groove formed with the body springs and the interlink springs, in such a manner that at least part of the tread member is embedded in the groove.

3. The tire according to claim 2, wherein the tread member is detachably mounted on the skeleton portion.

4. The tire according to claim 2, wherein the tread member is configured to be in a shape of a rod having a through hole.

5. The tire according to claim 2, wherein the tread member further includes a securing member that secures the tread member to the skeleton portion.

6. The tire according to claim 2, further comprising a retainer that maintains a mounted state of the tread member on the skeleton portion.

7. The tire according to claim 1, wherein the tread member is detachably mounted on the skeleton portion.

8. The tire according to claim 7, wherein the tread member is configured to be in a shape of a rod having a through hole.

9. The tire according to claim 7, wherein the tread member further includes a securing member that secures the tread member to the skeleton portion.

10. The tire according to claim 1, wherein the tread member is configured to be in a shape of a rod having a through hole.

11. The tire according to claim 10, wherein the tread member is secured to the skeleton portion using at least one coil spring inserted into the through hole.

12. The tire according to claim 1, wherein the tread member includes a core material onto which the nonwoven fabric is wound.

13. The tire according to claim 1, wherein the tread member further includes a securing member that secures the tread member to the skeleton portion.

14. The tire according to claim 1, further comprising a retainer that maintains a mounted state of the tread member on the skeleton portion.

* * * * *